UNITED STATES PATENT OFFICE.

AUGUST ALBERT, OF MUNICH, GERMANY.

PROCESS OF MANUFACTURING NEW ARSENIC OXIDES OR ARSENOBENZOLS.

1,425,930.     Specification of Letters Patent.     Patented Aug. 15, 1922.

No Drawing.     Application filed March 25, 1922. Serial No. 546,793.

*To all whom it may concern:*

Be it known that I, AUGUST ALBERT, a citizen of the Republic of Germany, and residing at Munich, Elisabethstrasse 46, Germany, have invented a new and useful Process of Manufacturing New Arsenic Oxides or Arsenobenzols, of which the following is a specification.

In a patent application entitled "Process of manufacturing derivatives of organic arsenic compounds," filed simultaneously herewith, Serial Number 546,792, I have described a method of producing hydrazine compounds with arsenic by reacting a hydrazine compound with a mixed aromatic, aliphatic carbonyl arsenic compound. I have now discovered that the resulting products can be reduced by sodium hydrosulphite, phosphorus trichloride, phosphorous acid, mixed hydrogen iodide and sulphurous acid, sodium bi-sulphite, and the like in such a manner that the arsenic acid nucleus only is attacked, and the complicated hydrazone structure with its double linkings remains unchanged.

This selective reduction of the arsenic group may be stopped when the pentavalent arsenic has been reduced to oxide as the initial trivalent stage, thus:—

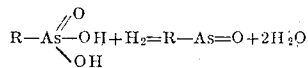

or the reduction may be continued until the arsenobenzol is produced in which the arsenic is still trivalent, thus:

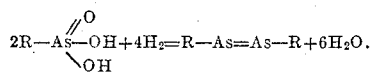

I will now give several examples which will serve as illustrations of these methods of practising my invention. However my invention is not limited to the examples cited, as it is capable of being practised by other methods.

1. 2.9 g. semicarbazone of the p-benzaldehyde arsonic acid:

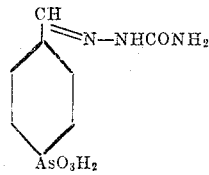

are dissolved in one mol of sodium hydrate and the solution made up with water to about 50 cc. This solution is added with continued stirring to a solution of 4 g. chloride of magnesium and about 29 g. sodium hydrosulphite in 50 cc. water. It is then heated with stirring to 50° or 60° for two hours. Arsenobenzol of an intense yellow color separates out. This must be sucked off, preferably under vacuum, washed with water and dried in vacuum.

2. 45 cc. of dried acetic ester is poured over 3 g. of semicarbazone of p-acetophenonarsonic acid;

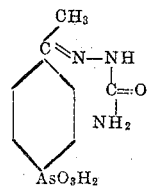

6 cc. of phosphorus trichloride are then added with water, cooled and stirred. The semicarbazone dissolves to a clear solution by this treatment. The reaction mixture is then allowed to stand for several hours in a closed vessel and then finally the acetic ester and phosphorus trichloride are evaporated on a water bath as far as possible. The oily residue becomes solid when treated with a solution of sodium carbonate as the desired arsenic oxide separates out.

3. 1.3 g. of the malonylhydrazone of p-acetophenonarsonic acid;

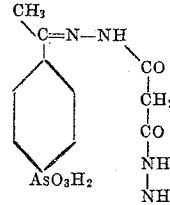

are brought in solution with 20 cc. of NaOH solution and 80 cc. water. To this solution 13 g. sodiumhydrosulphite are added; the solution, heated to about 60° is then well stirred for 1 or 2 hours. The separated yellow arsenobenzol is sucked off, washed well with water and dried in vacuum. When heated in a capillary tube to about 330°, it begins to darken without melting.

4. Over 1 g. of the semicarbazone of p-acetophenonarsonic acid, is poured with 5 cc. of a solution of sodium bisulphite and boiled up several times under a reflux cooler. The reduction is thereby for the most part completed. The solution is then preferably allowed to stand on the water bath for a half an hour or an hour; the corresponding arsenic oxide is then sucked off and well washed with water. The oxide has the same properties as those noted under example 2. It may be redissolved in NaOH solution and reprecipitated by a solution of ammonium-chloride as a snow white product. When heated in a capillary tube it shows no change and no melting below 360°.

5. 0.6 g. semicarbazone of the acetophenon-i-oxy-3 arsenic oxide;

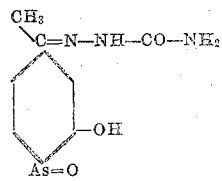

are stirred with 6 cc. methyl alcohol and to this suspension is added 2.5 cc. of an 8 times normal solution of hydrochloric acid in methyl alcohol. A nearly clear solution is thereby produced. A solution of 0.5 g. tin chloride in 8 cc. of 8 times normal methyl alcoholic hydrochloric acid and 6 cc. methyl alcohol is added drop by drop to the filter solution with icewater cooling and stirring. It is filtered to remove sediment, and to the filtrate after about an hour is added 10 cc. 2n. aqueous hydrochloric acid, whereby the yellow colored arsenobenzol separates. It is dried in vacuum and decomposes at about 220°.

6. 0.4 g. of the phenylhydrazone of i-oxy-2-acetophenon-6-nitro-4 arsenic acid;

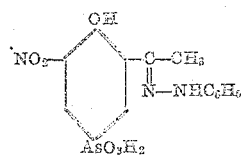

having a decomposition point of 225°, is dissolved in 21 mols of NaOH solution. This solution is diluted with 8 cc. water and combined with 0.1 g. potassium iodide. After addition of four or five cc. sulphuric acid 1:5 sulphur dioxide is passed with water cooling for about one hour during which some precipitation occurs. The solution is allowed to stand in a well closed vessel for 24 hours and then the corresponding arsenic oxide is filtered off with suction. It may be redissolved in NaOH solution and is reprecipitated as a light yellow brown powder by a solution of ammonium chloride. When heated in a capillary tube, it decomposes explosively at about 270° and darkens in color.

Claims:

1. Process of preparing a compound containing trivalent arsenic and a hydrazone group which consists in treating with a reducing agent an aromatic compound which contains an arsonic acid group attached to the benzol nucleus and a hydrazine group attached to the benzol nucleus through carbon.

2. Process of preparing a compound containing trivalent arsenic and a hydrazone group which consists in treating with sodium hydrosulphite an aromatic compound which contains an arsonic acid group attached to the benzol nucleus and a hydrazine attached to the benzol nucleus through carbon.

3. As a new compound, an arsenohydrazone of the type

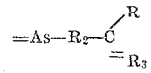

in which As represents trivalent arsenic, R represents hydrogen or an alkyl group, $R_2$ represents a phenyl group and $R_3$ represents a group containing a hydrazine nucleus.

4. As a new compound, the semi-carbazone of p-arseno benzaldehyde.

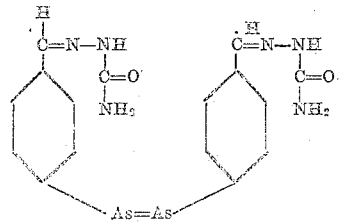

AUGUST ALBERT.

Witnesses:
 ALEXANDER DE SOTO,
 ALEXEI VON PHILLIPFF.